(12) United States Patent
Homsi (10) Patent No.: US 8,506,370 B2
(45) Date of Patent: Aug. 13, 2013

(54) ADJUSTABLE FITNESS ARENA

(75) Inventor: Kristopher L. Homsi, Beaverton, OR (US)

(73) Assignee: Nike, Inc., Beaverton, OR (US)

( * ) Notice: Subject to any disclaimer, the term of this patent is extended or adjusted under 35 U.S.C. 154(b) by 51 days.

(21) Appl. No.: 13/114,467

(22) Filed: May 24, 2011

(65) Prior Publication Data

US 2012/0302301 A1    Nov. 29, 2012

(51) Int. Cl.
*A63F 9/24*    (2006.01)

(52) U.S. Cl.
USPC ......... 463/2; 463/15; 463/16; 463/25; 463/40

(58) Field of Classification Search
USPC ...................................... 463/2, 15, 16, 25, 40
See application file for complete search history.

(56) References Cited

U.S. PATENT DOCUMENTS

| | | | |
|---|---|---|---|
| 4,751,642 A | 6/1988 | Silva et al. | |
| 5,524,637 A | 6/1996 | Erickson | |
| 6,073,489 A | 6/2000 | French et al. | |
| 6,098,458 A | 8/2000 | French et al. | |
| 6,308,565 B1 | 10/2001 | French et al. | |
| 6,430,997 B1 | 8/2002 | French et al. | |
| 6,575,851 B1 | 6/2003 | Lamberti et al. | |
| 6,641,139 B2 | 11/2003 | Lamberti et al. | |
| 6,749,432 B2 | 6/2004 | French et al. | |
| 6,765,726 B2 | 7/2004 | French et al. | |
| 6,876,496 B2 | 4/2005 | French et al. | |
| 6,882,955 B1 | 4/2005 | Ohlenbusch et al. | |
| 7,005,993 B2* | 2/2006 | Webb et al. | 340/601 |
| 7,038,855 B2 | 5/2006 | French et al. | |
| 7,359,121 B2 | 4/2008 | French et al. | |
| 7,418,429 B1* | 8/2008 | Mok et al. | 705/67 |
| 7,791,808 B2 | 9/2010 | French et al. | |
| 7,864,168 B2 | 1/2011 | French | |
| 2006/0267287 A1 | 11/2006 | Lamberti et al. | |
| 2007/0176368 A1 | 8/2007 | Lamberti et al. | |
| 2009/0069123 A1 | 3/2009 | Nugent | |
| 2009/0210078 A1 | 8/2009 | Crowley | |

(Continued)

FOREIGN PATENT DOCUMENTS

WO    2011006989    1/2011

OTHER PUBLICATIONS

VirTra Systems, VirTra 300 MIL™, http://virtra.com/products/3NirTra+300+MIL/, © VirTra Systems, Inc., last accessed on May 19, 2011.

(Continued)

*Primary Examiner* — Pierre Eddy Elisca
*Assistant Examiner* — Shahid Kamal
(74) *Attorney, Agent, or Firm* — Banner & Witcoff, Ltd.

(57) ABSTRACT

Aspects of this disclosure relate to systems and methods for conducting sport-specific activities. Illustrated systems may be adjustable to permit a performance of different sport-specific activities. Further aspects relate to using sensor data to evaluate a user's performance and determine sport-specific fitness parameters. Various fitness parameters may measure reactive agility and/or the physiological state of the user, such as when in an exhausted state. Illustrated systems may have structures with an output device and a sensor. The structure may include a vertically-arranged planar surface to form a wall. Several structures may be configured to form a boundary. The boundary may be automatically adjustable, for example, depending on one or more specific fitness routines to be implemented. Calculated fitness parameters may be visually mapped on the structures of the system.

15 Claims, 6 Drawing Sheets

(56) References Cited

U.S. PATENT DOCUMENTS

2010/0311494 A1* 12/2010 Miller et al. .................. 463/22
2010/0311502 A1* 12/2010 Miller et al. .................. 463/30
2011/0042246 A1* 2/2011 Rowan ......................... 206/216

OTHER PUBLICATIONS

Sportwall XerPro, Interactive Fitness and Sports Training, http://www.xergames.com/products/xerpro.html, Exercise Technology, Inc., Ventura, CA, © 2010, XerGames™, last accessed on May 19, 2011.

Performance Sports, XerGames—Interactive Figness, Dance, and Sports Training Solutions, http://www.xergames.com/solutions/performancesports.html, Exercise Technology, Inc., Ventura, CA, © 2010, XerGames™, last accessed on May 19, 2011.

Gabbett et al., Reactive agility of rugby league players, J Sci Med Sport. Jan. 2009; 12(1):212-4. Epub Feb. 20, 2008 http://www.ncbi.nlm.nih.gov/pubmed/18069064.

Sheppard et al., An evaluation of a new test of reactive agility and its relationship to spring speed and change direction speed, Journal of Science and Medicine in Sport (2006) 9, 342-349.

International Search Report and Written Opinion from International Application No. PCT/US2012/039351 dated Oct. 29, 2012 (12 pages).

* cited by examiner

ADJUSTABLE FITNESS ARENA

BACKGROUND OF THE INVENTION

Professional and amateur athletes alike strive to obtain a level of athletic ability. Unfortunately, however, their chosen exercise routines may not allow the athlete to excel to their full potential. Further, individuals without experienced coaches or trainers are even less likely to reach their full potential. Thus, merely following a standard exercise routine will not assist the individual to improve certain performance characteristics that may be important. For example, an individual who desires to play football for a professional sports team may have adequate speed to be considered a possible member of the team or league; however, his reactive agility may be below acceptable ranges. Blindly following an improper exercise routine may not improve his responsiveness.

Further, coaches and recruiters need to quickly determine the performance characteristics of several individuals in a relatively short period of time. Current systems and methods require training people to administer a plurality of testing protocols. Generally, each testing protocol requires individual equipment, leading to increased costs. Past attempts to utilize one machine or system to measure fitness parameters for different sports, (such as, for example: basketball and soccer) often failed due to the different activities that need to be conducted specific to each sport. Further, current systems and methods often rely on predefined activities and do not present activities which allow a user to determine a course of action. Rather, prior systems may permit users to remember routines rather than determine reactive agility to an unknown stimulus, thus for reactive agility measurements, prior art systems are largely ineffective and/or not sport-specific.

Therefore, for these and other reasons, there is a need for improved systems and methods.

BRIEF SUMMARY

The following presents a general summary of aspects of the invention in order to provide a basic understanding of the invention and various features of it. This summary is not intended to limit the scope of the invention in any way, but it simply provides a general overview and context for the more detailed description that follows.

Aspects of this invention relate to systems and methods for conducting sport-specific activities. In certain embodiments, a system may be adjustable to permit a plurality of different sport-specific activities to be conducted. Further aspects relate to using sensor data to evaluate a user's performance and determine sport-specific fitness parameters. For example, various fitness parameters may measure reactive agility in a user during activities simulating actions conducted during sporting events. Further parameters may relate to the physiological state of the user (such as, for example, an exhausted state) to measure reactive agility during the exhausted state and/or determine endurance. These and other aspects are briefly described below.

According to certain embodiments, an apparatus comprising at least one structure having an output device and a sensor is provided. The structure may include a vertically-arranged planar surface to form a wall. In other embodiments, the apparatus comprises several structures configured to be in operative communication to form a boundary. The boundary may be adjustable, for example, depending on one or more specific fitness routines to be implemented. The adjustment may be automatically performed upon selection of a specific routine or actions to be conducted. Furthermore, the structures of the apparatus may be adjustable to form an arena having a polygon-shaped perimeter. Exemplary dimensions that may be adjusted include: height, circumference, shape, and combinations thereof.

In one embodiment, the output device may comprise a display device and/or a speaker to provide instructional cues to a user. Display devices may be aligned with a planar surface of the apparatus to form a wall of display devices. The structures may further be arranged such that walls of display devices face an inner portion of the apparatus. The instructional cues may instruct one or more users to perform physical activities. In one embodiment, the instructional cues are intended to solicit sport-specific activities from a user that may be used to evaluate fitness parameters, such as relating to reactive agility. Such actions may be used to mimic a scenario that an opponent is approaching a user and require the user to rapidly determine where to pass a ball. Therefore, detecting the ball's impact, measuring one or more impact parameters, or utilizing data from other sensors may be utilized in determining an endurance—opponent avoidance—pass precision fitness parameter.

In one embodiment, the operational state of a display device may be altered to represent an opponent approaching the user, thus the instructions are not specific to a user action, but rather prompt a user to make a judgment as to what action he or she should conduct. In this regard, the apparatus may communicate with a non-transitory computer-readable medium comprising computer-executable instructions that when executed by a processor, cause the processor to operate the output devices in a manner to instruct or solicit a first user to perform the fitness activity.

In certain embodiments, cues may be simultaneously provided to multiple users. For example, the cues may replicate interaction of multiple users during a sporting event. Further implementations may operate display devices in a manner as to emphasize testing a preference for a user to utilize a left or right extremity and/or instruct the first user to kick or throw a ball towards a specific display device.

One or more sensors may be configured to detect an impact force upon the structure. In one embodiment, each of several display devices may be associated with a sensor, such that impact with (or proximate to) each display may be identified. Impact forces may be measured to determine an impact parameter in accordance with further embodiments. Exemplary impact parameters include: velocity, acceleration, direction, force, and combinations thereof. Information from additional sensors which may not be associated with a specific structure of the apparatus may also be used in measuring one or more impact parameters, including sporting devices (such as a ball used in a specific sport) and/or personal devices (such as a mobile terminal device). In this regard, fitness parameters may be calculated from one or more of: an impact parameter, sensor information from a sporting device, and sensor information from a device operatively connected to the first user. Further information may be obtained, such as physiological data, including, for example: heart rate, respiration, temperature, velocity, acceleration, sweat content, blood content, and combinations thereof.

Further fitness parameters may relate to the state of a user when conducting specific routines. For example, any one of the above parameters may be measured when the user is in an exhausted state. For example, one exemplary parameter may be measure endurance pass precision. In one implementation, information from one or more sensors may be utilized in a determination that a user is in an exhausted state. For example, a user's heartbeat, motion, or declining physical performance may indicate that the user is exhausted.

Impact locations on the structures may be visually mapped. The visual mapping may provide a first color representing impact locations. Further embodiments may display a first color for impact locations in which the impact meets or exceeds a threshold and a second color for impact locations in which the impact did not meet the threshold. Visual mapping may also be used to provide information regarding a plurality of impact parameters. For example, in addition to providing a first color at an impact location of a ball striking at a certain velocity (or within a range), an arrow or another indicia may be provided to indicate a direction of an impact force. For example, if a detected vector of the impact force is heading in a downward direction (for example, indicative of a ball descending), then indicia may be utilized to visually convey the direction of the impact force. Likewise, if a detected vector of an impact force is heading in an upward direction, such as indicative of a ball ascending away from a floor or bottom surface, then a second indicia may be visually provided to convey this value. Further, such information may be utilized to visually convey if a ball was spinning in a certain direction, such as a curve ball. Further information relating to the impact forces may also be visually represented. For example, visualized impact force locations resulting from a soccer ball kicked with a left foot may be visually distinguishable from impact force locations resulting from a soccer ball kicked with a right foot. Such implementations may readily allow users (and/or training staff) to determine if a user favors a right or left foot and/or whether this causes more imprecision or inaccuracy. Further, physiological parameters may be displayed in association with the corresponding impact location. Exemplary physiological data that may be associated with mapped impact locations may include, but is not limited to: heart rate, respiration, temperature, velocity, acceleration, sweat content, blood content, and combinations thereof. For example, a user's heart rate may be mapped against impact locations to show how the user's accuracy declined as the heart rate changed. Similarly, velocity of the user may be mapped against impact forces to demonstrate better precision when running at certain speeds or certain directions at impact with a ball or other sporting device. Further, any motions of the user may be utilized, including whether a user utilizes a left or right extremity (i.e., hand or foot) as discussed above.

Further, in certain embodiments, the location of the detected impact parameters may be utilized, at least in part, to determine a second fitness activity to be executed using the apparatus. In one embodiment, a physical dimension of the apparatus, such as a dimension of the perimeter may be adjusted before initiation of the second fitness activity.

These and other features of the invention will become apparent from the following detailed description.

BRIEF DESCRIPTION OF THE DRAWINGS

A more complete understanding of various aspects disclosed herein and certain advantages thereof may be acquired by referring to the following detailed description in consideration with the accompanying drawings, in which:

FIG. 1 illustrates an exemplary fitness system in accordance with one embodiment; specifically

The reader is advised that the attached drawings are not necessarily drawn to scale.

DETAILED DESCRIPTION

In the following description of various example structures and methods in accordance with the invention, reference is made to the accompanying drawings, which form a part hereof, and in which are shown by way of illustration various fitness devices and systems using fitness devices in accordance with various embodiments of the invention. Additionally, it is to be understood that other specific arrangements of parts and structures may be utilized and structural and functional modifications may be made without departing from the scope of the invention.

Figure 1A:
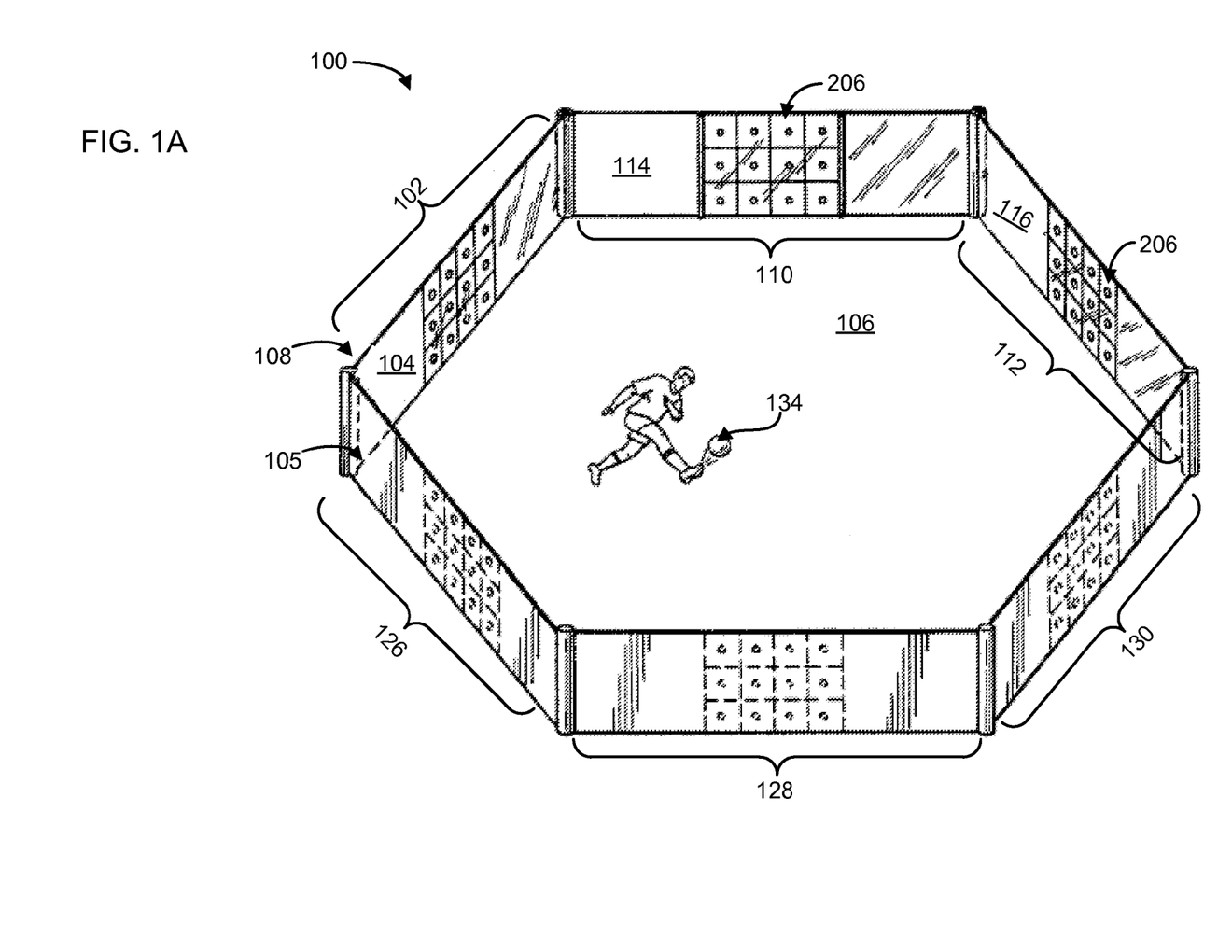
FIGS. 1A and 1B show perspective views of an exemplary fitness structure in a first configuration and FIG. 1C shows a top view of an exemplary fitness structure.

Aspects relate to fitness systems or devices having one or more adjustable structures. FIG. 1A shows an illustrative fitness system 100 according to one embodiment. Fitness system 100 may comprise one or more fitness structures, such as structure 102. Structure 102 (or any other structure disclosed herein) may comprise a first surface 104 that when properly configured and oriented, faces an interior region, such as interior region 106 of fitness system 100. As shown, first surface 104 may be relatively planar shaped, such as to form a vertically extending wall from a bottom portion 105 to a top portion 108 along a vertical axis. In other embodiments, first surface 104 may be shaped, arranged, or otherwise configured to be off-axis with respect to the vertical axis. Further, the shape of first surface 104 may be variable, such that a first portion (such as near the top portion 108) may be curved, a second portion is substantially straight, and a third portion (such as near the bottom portion 105) may be curved at a different rate or direction than the first portion.

In further embodiments, at least a portion of structure 102, including for example, first surface 104, comprises one or more rigid materials, including but not limited to metals, woods, plastics, and combinations thereof. As will be understood by those skilled in the art with the benefit of this disclosure, the rigidity of surface 104 or any surface of a structure, such as structure 110, will depend on a myriad of factors, including but not limited to: intended usage, portability, manufacturing tolerances, protection of internal sensors, noise production and combinations thereof. In this regard, surface 104 may comprise zones of varying rigidity. For example, a first zone may be construed of metal, plastic, and/or other materials designed to resist deformation, yet other zones may be constructed of the same and/or other materials in a manner to permit more absorption of an impact force and/or more readily deformable than the first zone.

As further shown in FIG. 1A, structure 102 may be in physical and/or electronic communication with one or more other structures, such as illustrated structures 110 and 112. One or more structures, including illustrated structures 102, 110 and 112 may be configured to be operatively connected to form a boundary or perimeter. As shown in FIG. 1A, structures 102, 110 and 112 are connected such that a wall-like boundary is formed in which surfaces 104, 114 and 116 are arranged to face the interior region 106, however, the boundary is not required not define a closed perimeter (such as perimeter 132 shown in FIG. 1C, which is discussed below).

Figure 1B:
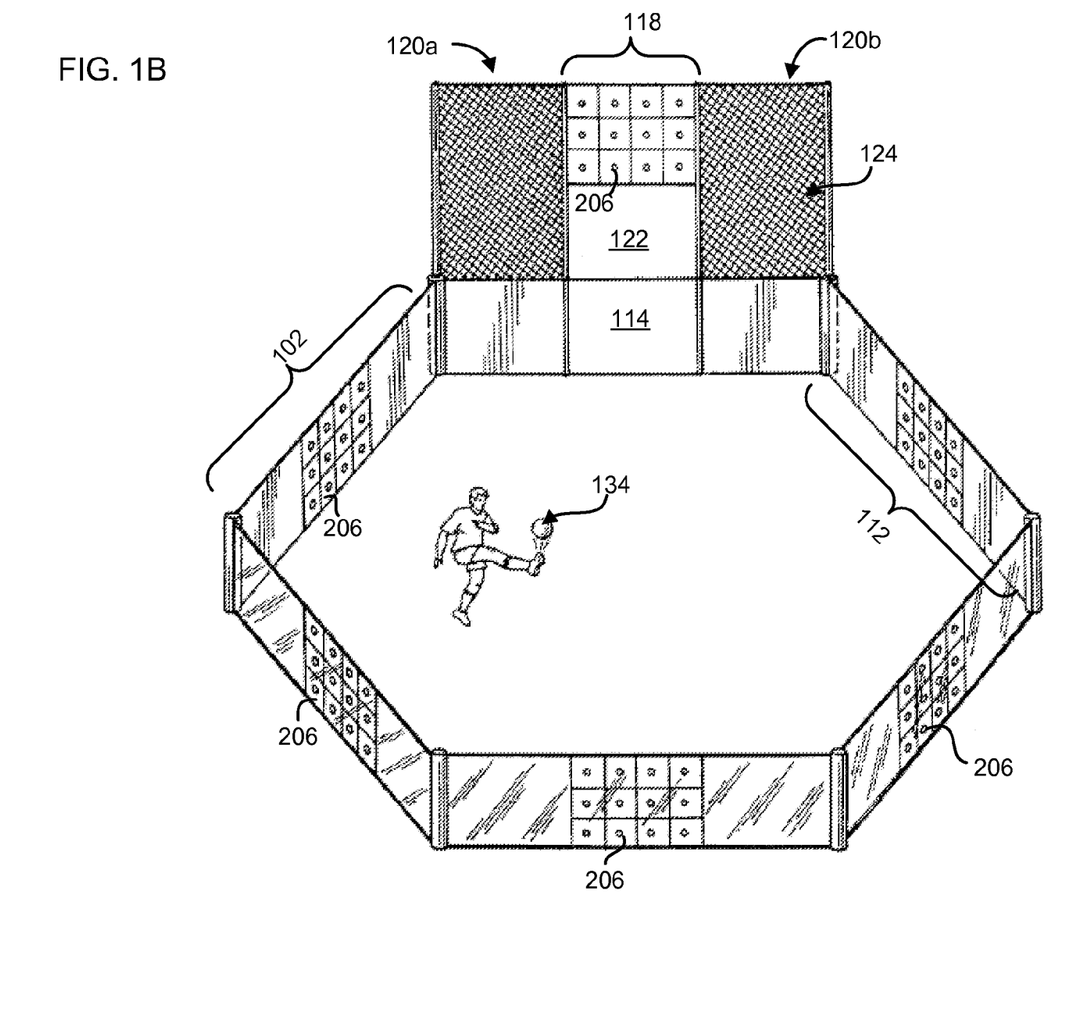

Further embodiments may comprise structures operatively connected along a vertical axis. For example, structure 118 may be operatively connected to structure 110. As shown in FIG. 1B, structure 118 may be operatively connected to structure 110 via one or more extensions 120a, 120b (collectively 120). Extensions 120 may comprise one or more substantially rigid material as to permit support of structure 118 above the structure 110. In one embodiment, structure 118 may be supported in a position that is substantially aligned with structure 110 along a vertical axis. As shown in FIG. 1B, extensions 120 may further define a void, such as void 122 in between structure 110 and structure 118. Thus, while structures disclosed as part of system 100 may be operatively connected to form a unified structure, such as the illustrated connection of structure 110 and structures 102 and 112, there is no requirement, absent any affirmative requirement, that any connected structures be in uniform communication to create uniform structures with no breaks or voids. In this regard, exemplary materials, such as netting material 124 may be provided throughout the system 100, such as within or part of extension(s) 120, void 122, periphery locations, or any other locations.

Structure 118 and/or any other structures (such as for example, structures 102, 110, and/or 112) of system 100 may be adjustable. In one embodiment, structure 118 may be adjustable so an overall height of structure 118 is variable. In one embodiment, structure 118 may be adjustable between a first position and to a second position that is an extended position, and yet further extendable to a third position. In this regard, extensions 120 may serve as or be associated with guides or tracks configured to adjust structure 118 between one or more positions. Adjustment of any structure, including structure 118, may be performed through an electric motor, a mechanical mechanism, or through an electrical-mechanical mechanism. As will be explained later, the adjustment of structures, such as structure 118, may be performed automatically, such as through the execution of computer-executable instructions on a non-transitory computer-readable medium. In this regard, while the exemplary adjustment of structure 118 was discussed in the context of positions along a vertical direction, those skilled in the art will readily appreciate that any structure may be adjusted along any other axis, including a horizontal axis. In yet other embodiments, a plurality of structures may be operatively connected to define a perimeter around the interior region 106. As shown best in FIG. 1C, multiple structures may be linked together to form a polygon. For example, in the illustrative embodiment of FIG. 1C, structures 102, 110 and 112 (as shown in FIG. 1A) may be operatively connected with structures 126-130 to create polygon-shaped perimeter 132 that defines an arena having interior region 106. While the illustrated perimeter is generally hexagon-shaped, those skilled in the art will readily appreciate that any other polygonal shape, including any irregular polygon shape is within the scope of this disclosure. In this regard, other shapes, such as circles and/or ovals are also within the scope of this disclosure.

System 100 may be adjustable such that perimeter 132 may define a hexagon-shaped polygon in a first implementation, a pentagon-shaped polygon in a second implementation, and then perimeter 132 may not be present in a third implementation, but rather system 100 may comprise an open boundary such as if a portion of the system 100 shown in FIG. 1A is removed and not utilized. For example, one or more of structures 102, 110, 112 and 126-130 may not be present and/or may be removable. In one embodiment, only structures 102, 110 and 112 may be provided. As discussed throughout this document, dimensions of system 100 (and/or structures, such as structure 102) may be adjustable based upon a specific sporting action to be simulated using system 100. Exemplary dimensions that may be adjustable include, but are not limited to: height, circumference, shape, and combinations thereof.

Figure 1C:
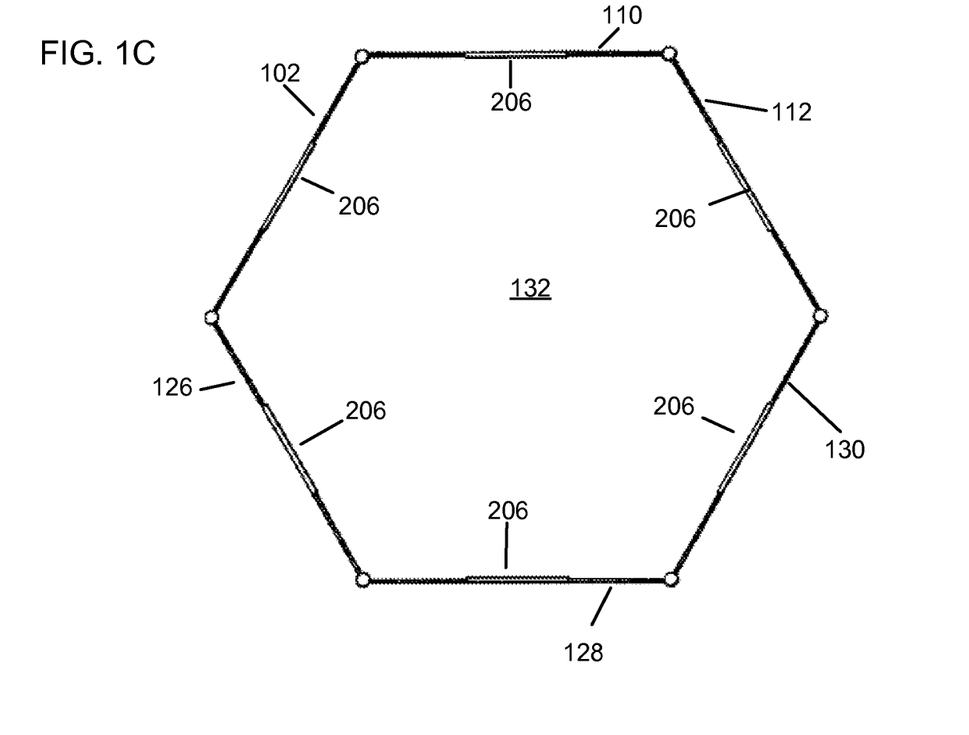

Although many of the surfaces illustrated in FIGS. 1A-1C, such as surfaces, 102, 110, 112 and 126-130 appear to be substantially identical, those skilled in the art with the benefit of this disclosure will appreciate that one or more structures may be of varying dimensions and capabilities. For example, structure 112 may be wider than structure 118 and as will be explained below, one or more structures may have functionality not provided by one or more other structures. Further, one or more surfaces or components of each structure may be formed of different materials than structure 102 (including first surface 104). For example, surface 116 of structure 112 may comprise malleable materials to more readily absorb an impact force upon surface 116. This may be especially advantageous in certain embodiments to shield one or more components, including for example, sensors or displays, which will be explained in more detail below. Further, one or more structures may not comprise a planar first surface (see, e.g., the illustrated first surface 104) or have wall-like surfaces. Rather, various surfaces may be curved, spherical, irregular, or any other shape that may be useful for a structure according to the various embodiments disclosed herein. For example, structure 118 may comprise a hoop-shaped portion that mimics a basketball hoop. Yet, in other embodiments, structure 118 (or any other structure) may comprise a goal post, boundary markers, or any other shapes.

In yet further embodiments, one or more structures (such as, for example, structure 102) may comprise an opening or port configured to permit a projectile to be projected from at least a portion of a structure. For example, certain embodiments may comprise an opening, such as part of first surface 104, configured to permit the passage of a sporting device, such as a football, soccer ball, baseball, puck, or any other object capable of being projected. One or more openings may allow an object to be projected away from the structure towards inner region 106. As will be appreciated by those skilled in the art, a plurality of different structures of system 100 may be configured to have multiple openings of varying dimensions. Further, openings may be positioned at different locations with reference to a vertical axis. For example, a first opening may be positioned proximate to the bottom 106 of first surface 104 and a second opening may be positioned proximate to the top 108 of first surface 104. Yet in another embodiment, a third opening may be positioned at a location about mid-distance from the bottom 106 and the top 108 relative to the vertical axis. At least one opening may be configured to allow the projection of a projectile that is of a different size than another opening on the same or different structure of system 100. Further, an opening may be configured to project a projectile at one more different angles respective to a horizontal and/or vertical axis.

Other structures, such as netting 124 may also be provided to allow retrieval of sporting devices, such as a ball or other sporting devices. As discussed below, one or more structures, including but not limited to structure 118 may comprise sensors and/or be interactive with devices, such as sporting devices and/or personal devices.

Figure 2A:
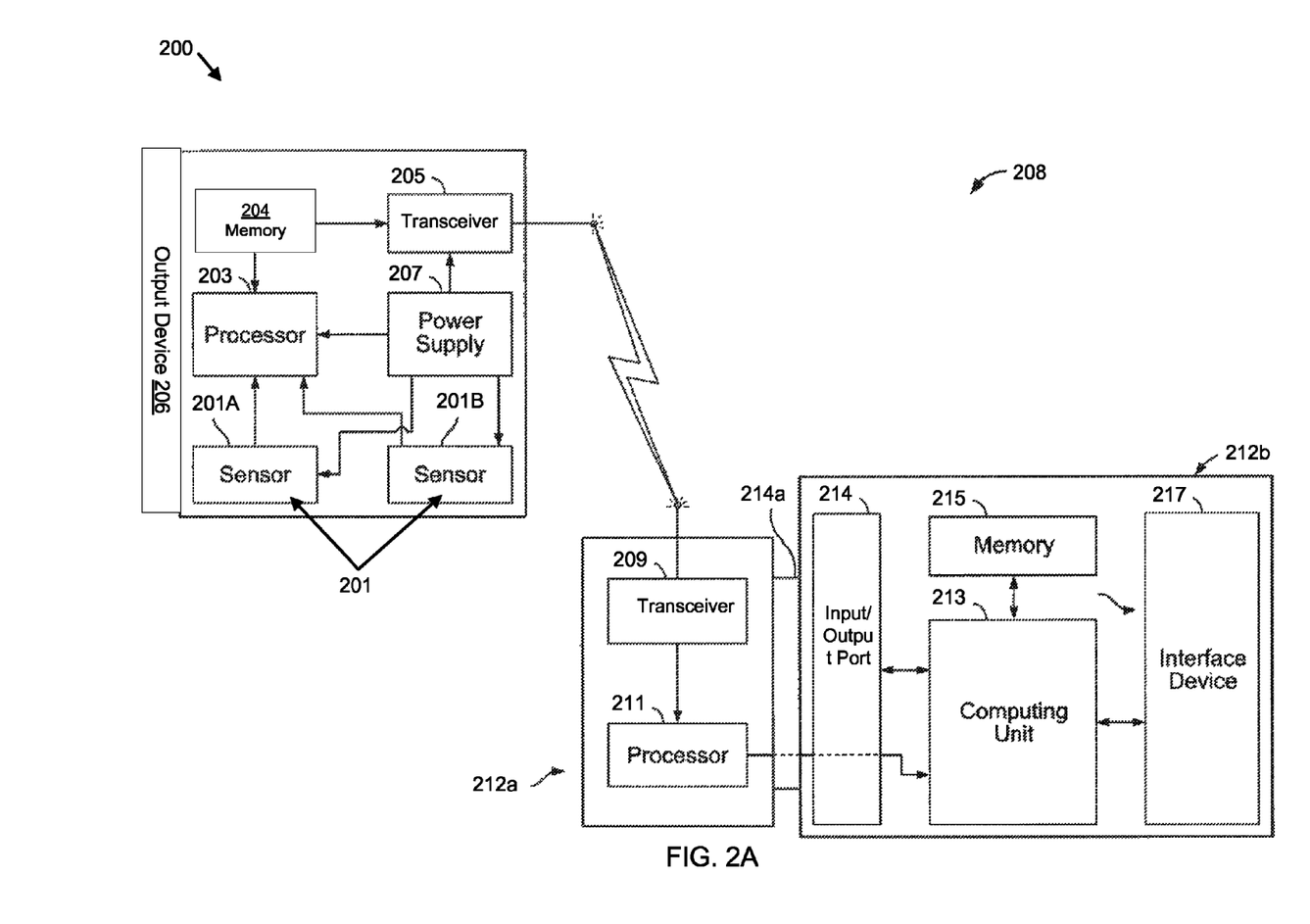
FIG. 2A shows an exemplary computing environment that may be used to implement various examples of the invention and FIG. 2B shows an exemplary output device that may be associated with a computing environment in accordance with various embodiments.

In accordance with various embodiments, one or more structures or other devices associated with system 100 may comprise a sensor. FIG. 2A shows exemplary fitness structure 200 in accordance with one embodiment of the invention. Structure 200 may be substantially similar to one or more of structures 102, 110, 112, 118 and/or 126-130 shown in FIG. 1A-1C. Structure 200 may comprise one or more sensors, such as sensors 201A and 201B (collectively referred to as sensors 201). Those skilled in the art with the benefit of this disclosure will appreciate that additional or fewer sensors may be utilized. Sensors 201 may be embedded within structure 200, such as shown in FIG. 2. Specifically, in certain embodiments, sensor 201A and/or 201B may be in proximity to first surface 202. In other embodiments, one or more sensors 201 may not be fully embedded within a structure. This may be advantageous, for example, to obtain accurate measurements from sensors 201. Yet, in other embodiments, one or more sensors may be positioned on an outer surface of a structure, such as the first surface 202 of structure 200. Regardless of whether one or more sensors 201 are fully or partially encased within fitness structure (i.e., structure 200), one or more sensors 201 may be removable and/or interchangeable. This implementation may be useful for one or more reasons, for example, to readily permit the replacement of faulty or aged sensors. In certain implementations, it also may permit fitness system 200 to be utilized in various activities (such as those described below). In yet further embodiments, a sensor may not be physically attached to a specific structure, but nonetheless may be associated with one or more structures of system. For example, sensor 201A/201B may measure a property relating to structure 200. Yet in other embodiments, one or more sensors may be located outside of structure 200 and/or partially embedded within the structure. In this regard, there is no requirement that a sensor remains in constant contact with an associated structure. Further, sensors 201 may be removably or permanently positioned within a structure, such as structure 200. In certain embodiments, this may be advantageous to protect sensors 201 and/or to prevent tampering with the sensors 201.

Sensors 201 may include any apparatus(es) configured to detect a stimulus and provide a resulting signal. In one embodiment, one or more of sensors 201 may be configured to detect a force, such as an impact force from a person or object striking the first surface 202 of structure 200 or another structure of a system, such as system 100 shown in FIG. 1A. In certain embodiments, sensors 201 may be utilized to measure one or more parameters, such as, for example, velocity, acceleration, pressure, location, energy transfer, temperature, orientation, light, sound, magnetism, or a particular motion along two or more axes. In one embodiment, sensors 201 may comprise an accelerometer module. In one embodiment, the accelerometer module may be implemented with a two-axis accelerometer for measuring acceleration along two orthogonal axes. In another embodiment, the accelerometer module may be implemented with a three-axis accelerometer for measuring acceleration along three orthogonal axes.

Further exemplary sensors may include strain gauges, conductive ink, piezo-electric devices and/or pressure transducers. In certain embodiments, relative pressure applied to two or more sensors 201 can be used to indicate weight distribution. In certain embodiments, sensors 201 may comprise a camera. A camera may detect or measure one or more properties of a user, either before, during or after, any processes or routines disclosed herein. A camera may be incorporated, either physically or logically, into one or more fitness devices, including for examples, structures 110, 118, and/or a floor or bottom surface of inner portion 106. A camera may comprise any type of imaging equipment configured to capture one or more images and any spectrum of light. On or more cameras may be configured to detect 3-dimensional motion or utilized in the rendering of a 3-dimensional animation of detected motion.

In certain embodiments and as further shown in FIG. 2A, sensor 201A may be of the same type as sensor 201B. For example, in one embodiment, sensors 201 may each be accelerometers. In other embodiments, sensor 201A may be similar, but not the same as, sensor 201B. For example, sensor 201A may comprise a first accelerometer configured to detect acceleration within a first range, and sensor 201B may comprise a second accelerometer configured to detect acceleration within a second range. In certain embodiments, the first range may overlap or otherwise be inclusive of values within the second range detectable by the second accelerometer. In still yet other embodiments, sensors 201 may measure different parameters. For example, in one embodiment, sensor 201A comprises an accelerometer and sensor 201B may comprise a pressure sensor.

Sensors 201 may be active or passive. For example, in certain embodiments, one or more sensors may actively transmit or provide an output, such as a wireless signal that may be used in the detection of a parameter. For example, sensors 201 may comprise electromagnetic devices, such as wireless sensors, including for example radio frequency, electromagnetic and/or optical sensors. In one embodiment, one or more sensors may be implemented with microstrip antennas. Yet, in other embodiments, sensors 201 may comprise a passive sensor configured to detect and/or measure a stimulus. Regardless of whether sensors 201 are active or passive, sensors 201 may detect stimuli or a result of stimuli transmitted by another sensor of either fitness device 100 or another device, such as a second fitness device, or a non-fitness device. Power to sensors 201 may be provided by power supply 207 (which is discussed below). Further operational aspects of sensors 201 is discussed in more detail below in reference to the flowcharts shown in FIGS. 3-4.

As further shown in FIG. 2A, structure 200 may comprise one or more output devices, such as output device 206. (As discussed above, structure 200 may be at least a part of or comprise one or more of the illustrative structures 102, 110, 112, 118, and/or 126-130 shown in FIGS. 1A-1C). Output device 206 may be configured to provide an audio, video, audiovisual, or tactile output. In certain embodiments, output device 206 may be configured to provide instructional cues to a user of system 100. Output device 206 may be positioned on an outer surface, such as first surface 202 of structure 200. Yet, in other embodiments, it may be embedded within structure 200. For example, in one embodiment, output device 206 may comprise a display device positioned behind transparent or translucent material, such that an output from output device 206 may be observed from the outside of structure 200. In certain embodiments, a plurality of adjacent structures may comprise an output device comprising a display device. For example, looking briefly back at FIG. 1A, output device 206 may be provided on a plurality of adjacent structures, including but not limited to: structures 102, 110, 112 and/or 118. In certain embodiments, at least one structure may comprise a plurality of display devices, such as to create a wall-like display. In certain embodiments, a plurality of adjacent structures each may comprise a plurality of adjacent display devices to create an appearance of a single display device.

Figure 2B:
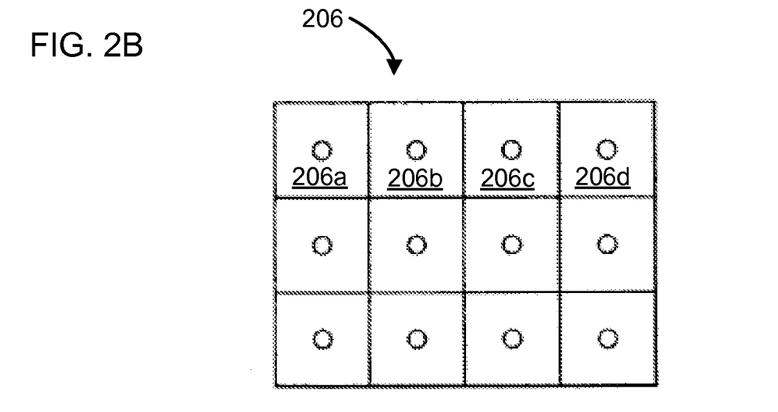

FIG. 2B shows an illustrative output device 206 which may be located, for example, on one or more of the exemplary structures (i.e., structures 102, 110, 112 and/or 126-30) shown in any of FIGS. 1A-1C. Exemplary display devices of output device 206 may comprise or be associated with a video adapter configured to drive an LED array having a plurality of pixels. The plurality of pixels may be configured to display different color spectrums. For example, red, green, white and blue LEDs (such as 206a, 206b, 206c, and 206d) may be driven by red, green, white and blue input signals respectively and may be positioned on a black background. Those skilled in the art will appreciate that a combination of red, green and blue LEDs allows for the generation of a wide variety of other colors. In alternative embodiments, other primary color combinations may be used. For example, magenta, cyan and yellow light emitting diodes may be utilized. Further, an LED array may be replaced with or used in combination with other light generation and display components such cathode ray tubes (CRTs), liquid crystal displays (LCDs), field emission displays (FEDs), plasma displays or any other device that produces an image that is viewable by a user of system 100. Exemplary uses of an output device, such as output device 206, comprising a display device are provided below in context of flowcharts 300 and 400 of FIGS. 3 and 4, respectively.

In further embodiments, output device 206 may comprise a sound emitting device. For example, output device 206 may comprise or otherwise be operatively connected to a speaker. One or more speakers may be in communication with a sound card coupled to other devices, such as a display device or any other component of structure 200. For example, audio output from a speaker may be synchronized with visual content displayed from a display device. In this regard, although only a single output device (e.g., output device 206) is shown, those skilled in the art with the benefit of this disclosure will appreciate that a plurality of output devices may be provided on a single structure, such as structure 200. In this regard, a first output device may comprise a display device, a second output device may comprise a speaker, and a third output device may comprise a mechanical or electromechanical device. Yet, in other embodiments, different types of display devices, speakers, mechanical devices and/or electromechanical devices may be utilized on a single structure, such as structure 200.

Output devices, such as output device 206, may be associated with one or more sensors, such as sensors 201A and/or 201B. For example, sensor 201A and/or 201B may be configured to detect an impact force upon display. In this regard, aspects disclosed herein relate to determining a user's response to simulated sporting scenarios. In certain embodiments, one or more sensors may be configured to detect performance parameters of a user (which may or may not be utilizing one or more fitness devices, such as a ball). In another embodiment, sensor 201A may be configured to measure a first parameter and sensor 201B may be configured to measure a second parameter. Operation of output device 206 and/or sensors 201 may be performed through one or more computer-readable mediums, such as memory 204 having computer-executable instructions that when executed by a processor, such as processor 203 perform a method of operating sensors 201 and/or output device, either independently or in combination. In one embodiment, the usage of output device 206 and/or sensors 201 through execution of computer-executable instructions stored on a computer-readable medium (such as memory 204) may be configured to detect or measure sport-specific reactive agility parameters.

Like sensor(s) 201, there is no requirement that processor 203 and/or memory 204 be enclosed within fitness structure 200. Rather, in other embodiments, processor 203 and/or memory 204 may be external to a fitness structure. In this regard, certain implementations may comprise a plurality of fitness structures and sensors that operatively communicate (wirelessly or wired) to a central processor and/or memory. Memory 204 may comprise read-only memory (ROM) and/or random access memory (RAM). As will be appreciated by those of ordinary skill in the art, memory 204 may store computer-implemented instructions for execution by a processor, such as processor 203. In certain embodiments, processor 203 may be configured to process output transmitted from sensors 201. Processor 203 may be a programmable microprocessor, yet in other embodiments, processor 203 may be a purpose-specific circuit device, such as an ASIC. In certain embodiments, memory 204 may comprise computer-executable instructions that when executed by a processor, such as processor 203, may be configured to cause the performance of one or more operations. Exemplary computer-executable instructions may include performing operations on the output from sensors 201, such as curve smoothing, noise filtering, outlier removal, amplification, summation, integration, or the like. While memory 204 and processor 203 are shown as being located within device 200, those skilled in the art will readily appreciate that either memory 204 and/or processor 203 may be external to fitness device 200.

In certain embodiments, processor 203 may be in operative communication with, and as such may provide processed or raw signals to, transceiver 205 for transmission to an electronic device, such as device 208. In certain embodiments, power supply 207 may be configured to provide power to transceiver 205, memory 204, processor 203 and/or sensors 201. The power supply 207 may be configured to accept either alternating current (AC) and/or direct current (DC). In certain embodiments, power supply 207 may comprise a converter for converting energy between AC and DC power.

Electronic device 208 may comprise transceiver 209 configured to communicate with transceiver 205 of the fitness device 200. In other embodiments, transceiver 209 may be configured to communicate with other fitness structures, such as one or more of structures 102, 110 or 112 shown in FIGS. 1A-1C, in addition to or in lieu of fitness structure 200. In certain embodiments, transceiver 209 may be in operative communication with a processor, such as processor 211. For example, transceiver 209 may transmit signals, such as raw or processed sensor data, to processor 211. Similar to processor 203, processor 211 may perform any desired operation on the processed signals, such as curve smoothing, noise filtering, outlier removal, amplification, summation, integration, or the like.

Further embodiments may comprise one or more electronic devices, such as electronic device 208. Electronic device 208 may comprise two or more detachable components, such as for example, components 212a and/or 212b. For example, component 212a may be a relatively smaller component than component 212b. For example, in one embodiment, component 212b is a mobile terminal device and/or a personal media player and component 212a provides further functionality to component 212b. Component 212a may connect to component 212b such that processor 211 may communicate with computing unit 213 of electronic device 208. Processor 211 may communicate directly with computing unit 213, and in certain embodiments, be a part of computing unit 213. Component 212a may also communicate with computing unit 213 and other portions of component 212b through input/output (I/O) interface 214, using one or more channels, such as channel 214a. In certain embodiments, for example, where 212a is not detachable, I/O interface 214 may be excluded. Further, processor 211 of component 212a and/or computing unit 213 of component 212b may be redundant or otherwise not required in certain embodiments.

Figure 3:
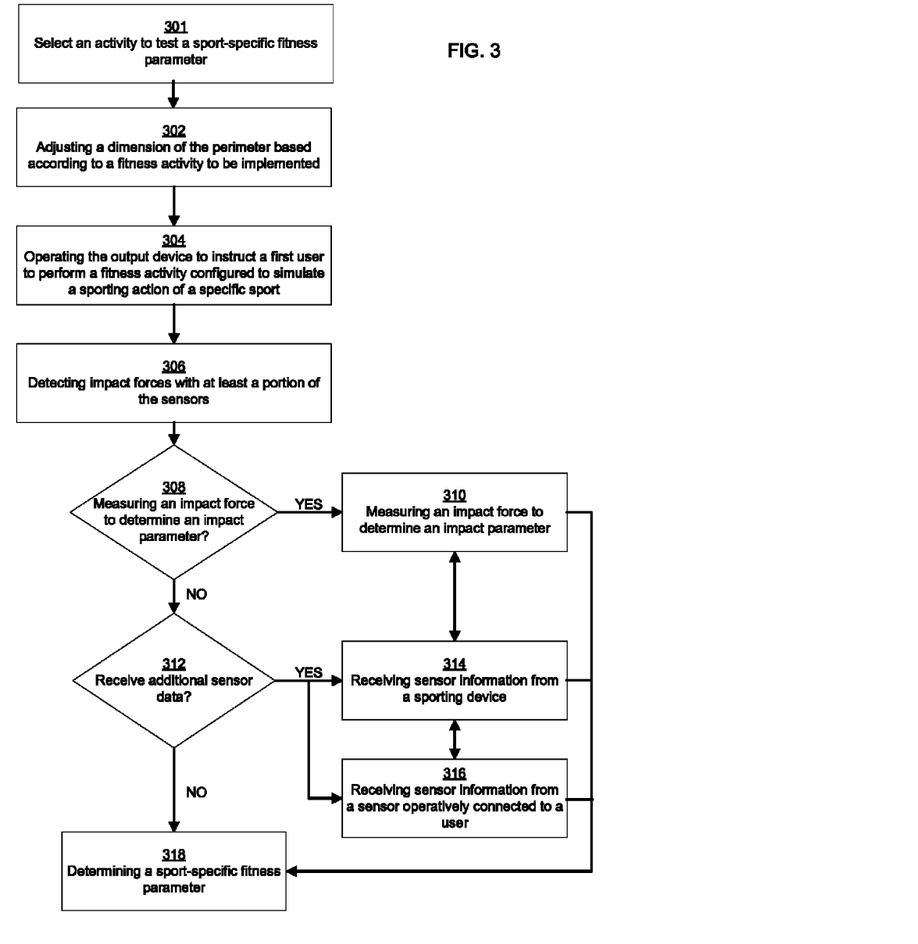
FIG. 3 is a flowchart of an exemplary method that may be implemented using a fitness structure according to various embodiments of the invention.
Figure 4:
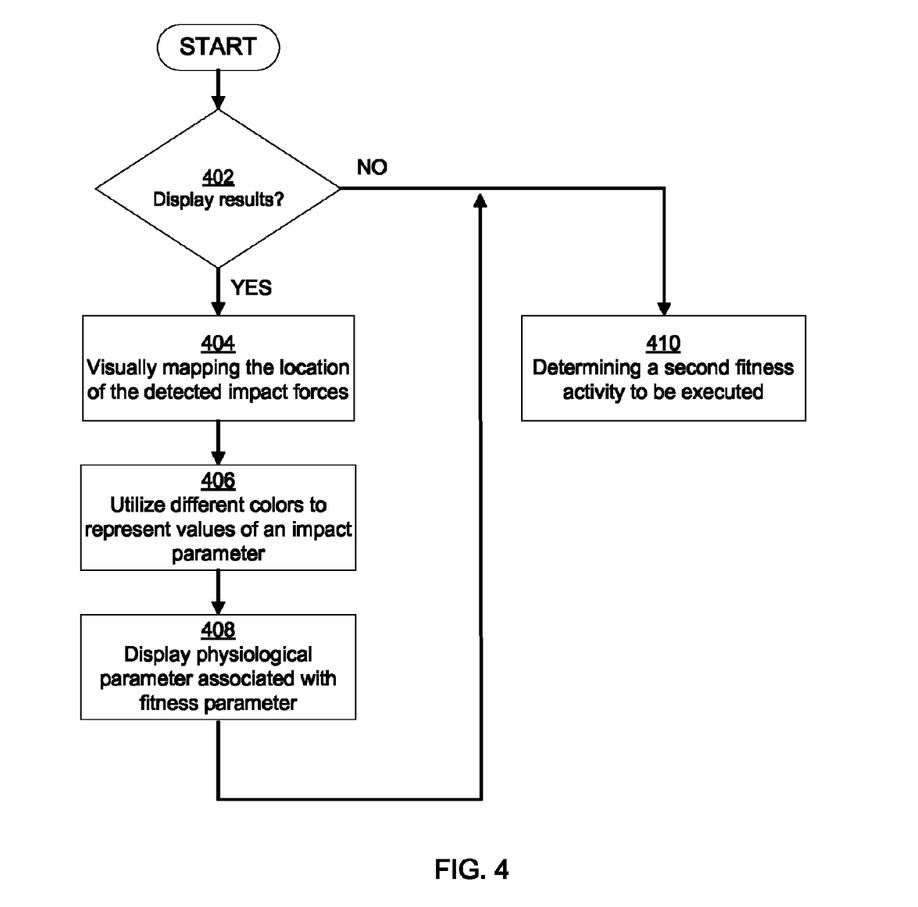
FIG. 4 is a flowchart of an exemplary method that may be implemented using a fitness structure according to various embodiments of the invention.

Computing unit 213 may comprise a processor configured to read and/or write data to memory 215. Exemplary data may include raw or processed signals from sensors 201. Computing unit 213 may further operate on processed signals provided by one or more fitness devices, such structure 200, for example, to generate a set of athletic data corresponding to athletic activity performed by a user. In certain embodiments, computing unit 213 may execute computer-executable instructions located on a memory, such as memory 215. Exemplary computer-executable instructions may include one or more processes discussed below in relation to FIGS. 3 and/or 4.

Electronic device 208 may further comprise I/O interface device 217. I/O interface device 217 may comprise one or more ports or interfaces (or devices connected through such ports or interfaces) configured to receive an input or transmit an output from device 208. In certain embodiments, I/O interface device 217 may comprise a peripheral device permanently or semi-permanently connected to the computing unit 213. For example, with many computers, the computing unit 213, memory 215, may be semi-permanently encased in a housing. In certain embodiments, such as mobile terminal devices or personal media players, a display may also be within the housing. In yet other embodiments, one or more other peripheral devices, such as a removable memory and/or a display may be removably connected to the computer. Interfaces or ports of the I/O interface device 217 may include, for example, one or more communication ports through which a peripheral device can be in operative communication with computing unit 213 (either directly or indirectly through, for example, a bus). Exemplary communication ports may include a parallel bus port or a serial bus port, such as a serial bus port using the Universal Serial Bus (USB) standard or the IEEE 1394 High Speed Serial Bus standard (e.g., a Firewire port). Alternately or additionally, I/O interface device 217 device may include a communication port configured to communicate with a network. In certain embodiments, I/O interface device 217 may comprise a wireless data "port," such as a Bluetooth interface, a Wi-Fi interface, an infrared data port, or the like.

It should be appreciated that electronic device 208 is merely illustrative and that various embodiments within the scope of this disclosure may include more or fewer components than electronic device 208 illustrated in FIG. 2A. In certain embodiments, electronic device 208 may include specific functionality, such as a server computer at a fitness center. Thus, depending on various implementations, peripherals, such keyboards and/or mice, however, comprise further devices, such as specialized or multiple communication connections, may be absent. Other exemplary embodiments of electronic device 208 may alternately or additionally employ computing devices that are intended to be capable of a wide variety of functions, such as a desktop or laptop computer. These computing devices may have any combination of peripheral devices or additional components as desired.

Before explaining illustrative operations and functions of system 100, which may comprise one or more structures, such as structures 102, 110, 112 shown in FIG. 1A-1C and/or structure 200 shown in FIG. 2A, exemplary embodiments may further be configured to interact with other devices. Therefore, for clarity, exemplary devices are briefly described below as exemplary optional components of system 100. In this regard, exemplary components may be fully operational devices or components that are commonly or routinely utilized apart from a system disclosed herein, however, may be used or adapted for use (and thus become part of) any of the systems described herein.

In accordance with various embodiments, a sporting device may be used with or become part of systems disclosed herein. The term "sporting device" includes any physical object that may be used or implicated during a specific sport. Exemplary sporting devices may include, but are not limited to: golf balls, basketballs, baseballs, soccer balls, footballs, powerballs, hockey pucks, weights, bats, clubs, sticks, paddles, mats, and combinations thereof. In further embodiments, exemplary fitness devices may include objects within a sporting environment where a specific sport occurs, including the environment itself, such as a goal net, hoop, backboard, portions of a field, such as a midline, outer boundary marker, base, and combinations thereof. In this regard, those skilled in the art will appreciate that one or more sporting devices may also be part of (or form) a structure (such as structure 200) and vice-versa, a structure may comprise one or more sporting devices or be configured to interact with a sporting device. For example, structure 118 may comprise a basketball hoop and a backboard, which may be removable and replaced with a goal post. In this regard, one or more sporting devices may comprise one or more sensors, such as sensors 201A and/or 201B, that may provide information utilized, either independently, or in conjunction with, other sensors, such as one or more sensors associated with one or more structures. For example, a backboard may comprise sensors 201 configured to measure a force and a direction of the force by a basketball upon the backboard and the hoop may comprise a sensor to detect a force.

As another example, sporting device 134 may comprise a soccer ball comprising a sensor, such as sensor(s) 201. Sensor 201 may include a removable accelerometer module that is configured to detect acceleration. The accelerometer module may be replaced with a different sensor (i.e., pressure sensor). Using removable sensors may permit a sensor, such as sensor 201A to be used with several different fitness devices, such as soccer balls, powerballs, footballs, and/or allowing a user to upgrade or replace a faulty device, without having to obtain a new sensor. In certain embodiments, placement of one or more sensors 201 may be configured so that the weights of the included sensors 201 do not change the balance or center of gravity of the sporting device 134.

In certain embodiments, one or more sensors may be held, attached or worn by a user. Exemplary "personal" devices may include, clothing such as shoes, shirts, shorts, gloves, hats, or electronic devices, such as watches, phones, media players, among others. In one embodiment, sensors may be attachable to a user's shoe. In another embodiment, a device may be attachable to a user's arm, such as similarly performed by a watch, ring, or graspable by a hand, such as any handheld electronic device, including mobile terminal devices and/or personal media players. Those skilled in the art will readily appreciate, with the benefit of this disclosure, that one or more personal devices may comprise a sporting device, structure such as structure 200, or any other component herein. Likewise, one or more structures may include or be configured to interact with one or more personal devices.

In view of the foregoing and the remaining disclosure, illustrative methods that may be implemented, executed or otherwise associated with will be described. FIG. 3 is a flowchart of one exemplary method of utilizing a fitness system in accordance with one embodiment. While various blocks of FIG. 3 (and FIG. 4) are shown in a linear arrangement, those skilled in the art with the benefit of this disclosure will readily appreciate that flowchart 300 is merely exemplary and that the illustrated blocks may be performed in any order, including simultaneously with one or other actions, including those activities associated with another block of flowchart 300 (or flowchart 400 shown in FIG. 4). Those skilled in the art will appreciate that one or more processes, steps, or actions disclosed herein may be omitted or part of further processes, steps, or actions or be combined with other combinations without departing from the scope of this disclosure.

Implementation of block 301 may be configured to select a fitness activity that is specific to a sport-specific fitness parameter. In one embodiment, the fitness activity may be configured to measure sport-specific reactive agility of one or more users. In one embodiment, a user input may be received that selects a specific routine from a plurality of routines. The user input may be received, for example, through I/O interface device 217 of electronic device 108. In one embodiment, the user input may select a specific activity protocol. The selection of the protocol may be made from a plurality of available protocols. The plurality of available protocols may be based, at least in part, from one or more results obtained from other processes, including, for example, other user inputs, such as from coaching or training staff, or from historical data.

The selection may be based upon a user input selecting a desired routine. For example, a professional soccer player who may want to test his endurance may select a Soccer-Endurance simulation rather than a Soccer-speed simulation. Yet, other embodiments may be merely directed towards a sport, such as just Soccer or Football. In yet other embodiments, selection at block 301 may be based, at least in part, on the detection of one or more sensors, for example, within a range of structures 102, 110 and/or 112. For example, sensors that may be detected include those associated with sporting devices or personal devices associated with the user, and combinations thereof. For example, the detection of a soccer ball within predefined vicinity may be used to select (or present for selection) one or more soccer-related soccer simulations. Yet, presence of other structures, such as structure 128, may also be utilized in the selection at block 301. In one embodiment, computer-executable instructions on a tangible non-transitory computer-readable medium may be utilized to identify a value associated with a user. Further, historical data or other information regarding a user may be utilized, at least in part, in a selection.

Block 302 may be implemented to adjust a dimension of a system. Adjustments may be based, at least in part, on the selection of initiation of a routine of block 301. In one embodiment, a dimension of system 100 may be adjusted. For example, if system 100 comprises a perimeter, such as perimeter 132, one dimension of perimeter 132 may be adjustable. For example, in one embodiment, at least one dimension may be adjusted based according to a fitness activity to be implemented using system 100. In certain embodiments, a dimension of a structure, such as structure 200 may be altered. Illustrative dimensions that could be adjusted may be selected from the group consisting of: height, circumference, shape, and combinations thereof. In one embodiment, computer executable instructions stored on a tangible, non-transitory computer-readable medium (e.g., memory 204 and or 215) may be configured to be processed by a processor (i.e., processor 203 and/or 211) to adjust one or more dimensions. In this regard, block 302 may comprise one or more processes configured to automatically adjust a dimension of a structure based, at least in part, according to a fitness or sporting activity to be implemented.

As further shown in flowchart 300, block 304 may be implemented to operate the output device 206, such as display device, to instruct user of the system 100 to perform a fitness activity configured to simulate a sporting action of a specific sport. For example, a display device may output one or more colors in a plurality of patterns to instruct (including soliciting) a user to perform a certain action. For example, one or more pixels of a display device may form a pattern to instruct a user to perform one or more actions, such as kicking a ball to a specific location, striking a ball with a bat in an effort to direct the ball towards a specific location, shooting a ball to a basket, moving to a certain location, touching a surface, such as first surface 202 or a component operatively attached to a surface, such as for example, output device 206. For example, output device 206 may be configured to provide a video and/or audio to kick a football at a certain location, such as at the display or audio device providing the output.

In one embodiment, output devices may be utilized to display a "start line" to indicate the location a user must initiate an activity. In certain embodiments, display devices may be located on a flooring or bottom structure proximate to inner portion 106. In certain embodiments, a visual indicator (such as an LED), may be associated with one or more of starting or ending locations for a routine. For example, a green LED may indicate that a user starts at a first location and a red LED may indicate that the user is to stop at a second location.

The operation of the output device(s) may be configured to measure a user's reactive ability. For example, the usage of output device 206 may be implemented to mimic, simulate or otherwise be similar to a specific fitness activity of a sport. For example, output device 206 may be utilized to instruct a user to conduct a certain activity that mimics an actual event or activity that may be presented in a specific sport. For example, if the specific sport is basketball, the output device 206 may be operated to relate to activities relating to: a dunk, defensive shell, offensive shell, or a different pace. If the sport is football, the output device 206 may be implemented or otherwise operated to instruct a user to kick a field goal, kick a punt, pass to specific player, decide to pass or rush when presented with an opponent. For example, one or more outputs from output device 206 may be implemented to test whether a user favors his/her right or left side (such as when kicking, passing, or rushing to a specific direction) when presented with an opponent (or other situation) at a certain location. In this regard, one or more operations may test how a user would perform under typical conditions in a specific sport. For example, one or more processes may be implemented to test where a user may position themselves, how fast they react to certain situations, and/or other variables. The use of output device(s) 206 may be configured to not allow a user to know what action may be prompted next as to permit testing or evaluation of reactive abilities, rather than to respond to known stimuli. Certain implementations may evaluate reactive agility parameters by instructing a user to conduct whole body movements, such as sprinting. Such instructions may instruct the user to abruptly change directions, turn a specific direction or combinations thereof.

In certain embodiments, an operational state of an output device, such as output device 206, may be altered to simultaneously instruct multiple users to perform activities. In one embodiment, two or more players may be instructed (such as by altering the operational states of one or more displays) to perform fitness activities configured to simulate a sporting action of the specific sport, wherein the combination of the instructions to a first user and the instructional cues to a second user are configured to instruct the first and second users to perform fitness activities configured to replicate interaction of the first user and the second user during a sporting event.

Those skilled in the art upon review of this disclosure will readily appreciate that in addition to or independent of selecting a sequence of images to display on a display device (or sounds from a speaker), computer-executable instructions on a non-transitory computer-readable medium may be configured such that upon execution by a processer, may perform one or more processes allowing for a broad array of options relating to the images displayed on display devices, including but not limited to: the longevity that each image is displayed, the color profile, contrast, brightness, and combinations thereof. In yet other embodiments, a user input may further select audio characteristics, such as indicating a sound to play during the display of a sequence of images. Sounds may mimic actual sport-specific activity, such as a whistle or buzzer.

In accordance with certain embodiments, an impact force may be detected (see, e.g. block 306). For example, in one embodiment, it may be detected whether a sporting device and/or a user contacted a first surface (e.g., first surface 202) of a structure, such as structure 200. In certain implementations, output device 206 comprises a display device that is configured to instruct a user to perform an action (i.e., such as discussed above in relation to block 304) and the display device 206 is further operative communication with sensor 201A and/or sensor 201B, such that the display device may be configured to operate as a sensor. For example, contact of a ball or another sporting device with a display device or output device 206 (which may be part of first surface 202) may be measured in accordance with one or more implementations of block 306.

Further embodiments may comprise measuring one or more parameters besides merely detecting an impact force. For example, in one embodiment, block 308 may be implemented to determine whether to measure an impact force (such as an impact force detected at block 306) to determine an impact parameter. The determination to measure an impact force may be a function of computer-executable instructions on a non-transitory computer readable medium. For example, if a user is performing a first sport routine, a first subset of impact forces may be measured, yet if a user is performing a second sport routine, a second subset of impact forces may be measured.

Block 310 may be implemented to measure one or more impact parameters from detected impact forces. Exemplary impact parameters that may be measured from a detected impact force may include, but are not limited to: velocity, direction, force, and combinations thereof. In this regard, there is no requirement that any measured impact parameters are solely determined by sensors with a structure, such as sensors 201 within structure 200. For example, if at block 312 it is determined to receive additional sensor information such as information from a sporting device or from a device operatively connected to a user exemplified by blocks 314 and 316 respectively, then such information from one or more sensors may be may be implemented in any measurement of impact forces. For example, measuring an impact parameter of a football striking a display may utilize information from sensors 201 as well as a sensor in the football and/or a sensor on a personal electronic device of the user. For example, the user's speed and/or time of impact may be detected by a personal device operatively connected to the user, and the football's direction and/or velocity may be detected by one or more sensors on the football. The data may include raw data and/or processed data.

As one example, a personal device operatively connected to a user may be configured to measure the user's velocity. Velocity may be measured along one or more axes using an accelerometer. For example, speed parameters could incorporate linear and/or lateral velocity. In other embodiments turning velocity may be considered, such as measuring the speed of a user changing directions, such as to their right or left or in the anterior or posterior direction. In certain embodiments, a multi-dimensional accelerometer may be utilized, such as to permit detecting velocity along 2 orthogonal axes. In another embodiment, an accelerometer may measure velocity along 3 orthogonal axes.

An accelerometer, either alone or in combination, with one or more additional devices, such as another sensor, may measure acceleration, inclusive of an initial or starting acceleration, deceleration, acceleration during different time-frames, and/or acceleration at specific locations. For example, sensors may be located on a floor or bottom surface within the interior portion 106 configured to detect pressure of the user, and therefore, the location of user. Yet in other embodiments, sensors associated with a personal device may be configured to transmit and/or receive information location data, such as through wireless signals. In one embodiment, GPS data may be utilized to detect the location of a user, fitness devices, or combinations thereof. In other embodiments, one or more sensors may comprise active or passive RFID components. For example, as a user passes within a proximity to an RFID apparatus, such as built within or attachable to structures 108-124, the location may be determined. In other embodiments, optical signals may assist in determining one or more performance characteristics. For example, if a user crosses a beam of light, the interruption of the light received at a sensor may indicate the location of the user, further the timing of the interruption of reception of signals (such as optical, wireless, and combinations thereof) may further provide data regarding other parameters, such as velocity, and/or acceleration.

Processing of data from a sensor, such as sensor 201A may be dependent on data received from another sensor, such as sensor 201B. In other embodiments, data from a plurality of sensors, such as sensors 201 may be combined. Those skilled in the art with the benefit of this disclosure will appreciate that the exact processing of data from one or more sensors may depend on a myriad of factors, including, but not limited to, the specific activity, the presence of a sporting device or personal device, an amount of processing required, a level of confidence desired in obtained data, and combinations thereof.

Calculation of one or more parameters may be performed using one or more algorithms or rules stored on a computer-readable medium, such as memory 215. Exemplary techniques for determining a user's speed from accelerometer signals are described in, for example, U.S. Pat. No. 6,898,550 to Blackadar et al., entitled "Monitoring Activity Of A User In Locomotion On Foot," and issued on May 24, 2005, U.S. Pat. No. 6,882,955 to Ohlenbusch et al., entitled "Monitoring Activity Of A User In Locomotion On Foot," and issued on Apr. 19, 2005, U.S. Pat. No. 6,876,947 to Darley et al., entitled "Monitoring Activity Of A User In Locomotion On Foot," and issued on Apr. 5, 2005, U.S. Pat. No. 6,493,652 to Ohlenbusch et al., entitled "Monitoring Activity Of A User In Locomotion On Foot," and issued on Dec. 10, 2002, U.S. Pat. No. 6,298,314 to Blackadar et al., entitled "Detecting The Starting And Stopping Of Movement Of A Person On Foot," and issued on Oct. 2, 2001, U.S. Pat. No. 6,052,654 to Gaudet et al., entitled "Measuring Foot Contact Time And Foot Loft Time Of A Person In Locomotion," and issued on Apr. 18, 2000, U.S. Pat. No. 6,018,705 to Gaudet et al., entitled "Measuring Foot Contact Time And Foot Loft Time Of A Person In Locomotion," and issued on Jan. 25, 2000, each of which are incorporated entirely herein by reference in their entireties for any and all purposes.

Those skilled in the art with the benefit of this disclosure will readily appreciate that any combination of sensor information may be used from a plurality of disparate devices in detecting or measuring an impact parameter. For example, data from one or more sensors may be received through transceiver 109 and stored on memory 115. Computing unit 113 may be used to calculate any impact parameters from the data.

Further, information from sensors 201 or any other sensors associated with a structure of system 200 may be utilized to calculate parameters relating to a sporting device, a user, or combinations thereof. In this regard, block 318 may be implemented to utilize detected impact forces (e.g., from block 306), measured impact parameters (e.g., from block 310), sensor information from a sporting device (e.g., from block 314) and/or sensor information from other sensors or devices (e.g., from block 316) during one or more processes to calculate or otherwise determine a sport-specific fitness parameter.

The sport-specific fitness parameter (such as calculated at block 318) may be any predetermined parameter configured to represent specific physical actions and/or scenario relating to a sport. For example, if the specific sport is soccer, exemplary fitness parameters may include a general reactive agility parameter specific to soccer. Yet in other embodiments, a reactive agility score may be specific to passing, scoring, corner kicking, speed, right-hand side preference, or combinations thereof. Further exemplary fitness parameters may include one or more sub-categories of these. Further, other categories besides reactive agility may be utilized. For example, further illustrative fitness parameters may relate to, but are not limited to: speed, agility, power, quickness, reaction and combinations thereof. For example, exemplary fitness parameters for soccer may include: pass speed, pass accuracy, pass precision, pass right-hand side preference and combinations thereof. These parameters are merely illustrative and further parameters may be more specific. For example, these or other categories may also be sub-divided into subcategories.

Still further exemplary fitness parameters may relate to the state of a user when conducting specific routines. For example, any one of the above parameters may be measured when the user is in an exhausted state. For example, one exemplary parameter may measure endurance pass precision. In one implementation, information from one or more sensors may be utilized in a determination that a user is in an exhausted state. For example, a user's heartbeat, motion, or declining physical performance may indicate that the user is exhausted. Therefore, a routine may be implemented to sequentially alter the operational state of at least a portion of a display device to represent an opponent approaching the user. Such actions may be used to mimic a scenario that an opponent is approaching a user and require the user to rapidly determine where to pass the ball. Therefore, detecting the ball's impact, measuring one or more impact parameters, or utilizing data from other sensors may be utilized in determining an endurance—opponent avoidance—pass precision fitness parameter.

Activities or routines that may be implemented to determine a parameter may have one or more sub-components. For example, a first sub-component may be designed and/or executed to primarily measure a first athletic quality or group of qualities from a user. Specific activities may be selected and/or grouped in an order depending on further variables, including user' characteristics, such as weight, gender, height, past performance, planned performance, goals, combinations of one or more of these characteristics among others.

FIG. 4 shows flowchart 400 of an illustrated method that may be implemented in accordance with one embodiment. Flowchart 400 may be implemented following a determination of one or more fitness parameters, such as calculated at block 318. Yet, in other embodiments, one or more processes disclosed in relation to flowchart 400 may be conducted, either in whole or in part, during or before one or more processes disclosed herein, including those disclosed in relation to FIG. 3. Block 402 may be implemented to display one or more results. In certain embodiments, results may be displayed on one or display devices associated with an output device, such as output device 206.

In one embodiment, locations of detected (or measured) impact forces may be visually mapped (see, e.g. block 404) on one or more structures, such as structure 200. For example, one or more display devices 206 on structures 200 may be illuminated to visually identify impact locations. One or more locations may be illuminated along with a virtual border or boundary, such as a boundary that would have been preferred or desired. In one embodiment, a visual boundary may be a goal, basket, or net that is shaped or scaled to represent a virtual sporting device used in a specific sport.

Visually mapping impact locations may be provided in association with various impact parameters. For example, block 406 may be implemented to utilize different colors (or other variables, such as intensity or brightness) of the display device(s) to represent values of impact parameters. For example, different colors may be utilized to represent different measured impact parameters, such as but not limited to: velocity, acceleration, direction, force, and combinations thereof. For example, locations where a soccer ball strikes the displays (or the location proximate to the displays) at or above a predefined threshold may be indicated with a green color, whereas locations where a soccer ball strikes below the threshold may be indicated with a red color. Those skilled in the art will appreciate that visually mapping the impact locations may comprise scaling or shading to represent the measured values. For example, instead of a binary output of two colors, certain embodiments may provide an output in which each value within a range is associated with value along a color scale, such that for example darker greens may represent faster velocities than lighter greens.

In addition to representing a first impact parameter value, visual mapping may be used to provide information regarding a plurality of impact parameters. For example, in addition to providing a green color at an impact location of a ball striking at a certain velocity (or within a range), an arrow or another indicia may be provided as part of or proximate to the green coloration to indicate a direction of an impact force. For example, if a detected vector of the impact force is heading in a downward direction, such as indicative of a ball descending, then indicia may be utilized to visually convey this. Likewise, if a detected vector of an impact force is heading in an upward direction, such as indicative of a ball ascending away from a floor or bottom surface, then a second indicia may be visually provided to convey this value. Further, such information may be utilized to visually convey if a ball was spinning in a certain direction, such as a curve ball. Further information relating to the impact force locations may also be visually represented. For example, visualized impact forces from a soccer ball kicked with a left foot may be visually distinguishable from impact force locations resulting from a soccer ball kicked with a right foot. Such implementations may readily allow users (and/or training staff) to determine if a user favors a right or left foot and/or whether this causes more imprecision or inaccuracy. As discussed above, measured impact parameter values may be obtained from a plurality of sensors, including sensors on structures, such as structure 102, sporting devices, such as ball 134, and/or personal devices, which may comprise portions of electronic device 208.

Block 408 may be implemented to display physiological parameters associated with the fitness parameter. For example, in one embodiment, impact locations may be visually mapped in association with a physiological parameter. Exemplary physiological data that may be associated with mapped impact locations may include, but is not limited to: heart rate, respiration, temperature, velocity, acceleration, sweat content, blood content, and combinations thereof. For example, a user's heart rate may be mapped against impact locations to show how the user's accuracy declined as the heart rate changed. Similarly, velocity of the user may be mapped against impact forces to demonstrate better precision when running at certain speeds or certain directions at impact with a ball or other sporting device. Further, any motions of the user may be utilized in block 408, including whether a user utilizes a left or right extremity (i.e., hand or foot) as discussed above.

Block 410 may be implemented to provide recommendations for a next activity or to implement a next activity. Implementation of block 410 may be based, at least in part, upon a portion of collected data from sensors within structures, such as structure 102, sporting devices, such as ball 134 and/or personal devices. In certain embodiments, any determinations or recommendations of an activity may be based, at least in part, upon one or more scores or sub-scores. However, specific sub-scores are not required to be calculated, but rather data, either raw or processed, may be used to provide recommendations. Determinations may be made by utilizing calculated fitness parameters, such as from block 318, and additional information, such as physiological data which may not have been used in the determination of the fitness parameter.

Historical data may be utilized as part of block 410. Exemplary historical data may include sensor data collected from previous activity protocols. For example, it may indicate that a user has increased or decreased his or her performance during certain activities. Further historical data may include information regarding other individuals, such as other individuals who have conducted the same or similar activity protocols. The data may be limited to others having similar user characteristics, including for example, gender and/or age. Block 410 may consider the user's goals or preferred level of performance. For example, if the user is a soccer player who wants to play in the Premier League, this data may be used to provide recommendations. Providing data obtained from other individuals may fuel competition and/or motivation to maintain an exercise routine. Further, the recommended routine may be more helpful to assist the individual to reach a specific goal. In certain embodiments, data may be associated with identifying information of third-parties. For example, the user's data may be compared against data from a plurality of individuals. In one embodiment, local individuals having predefined characteristics, such as similar scores, sub-scores, fitness parameters, demographic qualities, and combinations thereof may be identified. The user may be provided an opportunity to contact, either directly or indirectly, with other individuals. This may be beneficial, for example, to motivate the user by providing competition.

As additional example aspects of this invention, one or more elements or components of a fitness device or electronic device may be marketed, sold, or utilized as a kit. Kits may be associated with instructions for constructing a fitness device, including using one or more specific sensors with one or more fitness devices. Further instructions may indicate how to use one or more fitness devices during one or more activity protocols. In certain embodiments, instructions may be provided that indicate exemplary methods for using one or more fitness devices with one or more additional electronic devices to generate a score. Those skilled in the art will readily appreciate any instructions are not required to be printed and remain physically present with the other components of the kit, but rather the instructions may be provided on a computer-readable medium. Such instructions may reside on a server that the user may access. In accordance with certain embodiments, the user may be provided information, such as a link to an address on the Internet, which comprises the instructions, which would fall within the scope of providing instructions. Thus, as used herein, providing instructions is not limited to printed copies that are deliverable with a fitness device.

While the invention has been described in detail in terms of specific examples including presently preferred modes of carrying out the invention, those skilled in the art will appreciate that there are numerous variations and permutations of the above described systems and methods. Thus, the scope of the invention should be construed broadly as set forth in the appended claims.

We claim:

1. An apparatus comprising:
   a plurality of structures configured to form a boundary of vertically-extending walls defining an inner region, wherein the plurality of the structures each comprise:
      a first surface facing the interior region of the apparatus;
      a first display device on or in proximity to the first surface, such as to be displayable to a user within the interior region; and
      a sensor operatively connected to the first display device configured to detect an impact force;
   a processor; and
   a non-transitory computer-readable medium comprising computer-executable instructions that when executed by the processor, cause the processor to perform:
      operating at least one of the display devices to instruct a first user to perform a first fitness activity configured to simulate a first sporting action of a specific sport;
      detecting an impact force from a sporting device contacting a location of the first surface of a structure and measuring impact parameters corresponding to the detected impact force;
      receiving physiological data from a physiological sensor;
      determining a sport-specific fitness parameter by using detected impact forces from at least one sporting device contacting at least a portion of the first surfaces of the structures; and
      operating at least one of the display devices to instruct a first user to perform a second fitness activity configured to simulate a second sporting action of the specific sport.

2. The apparatus of claim 1, wherein the physiological data is selected from the group consisting of: heart rate, respiration, temperature, velocity, acceleration, sweat content, blood content, and combinations thereof.

3. The apparatus of claim 1, wherein the impact parameters are selected from the group consisting of: velocity, direction, force units, and combinations thereof.

4. The apparatus of claim 1, wherein the instructions, when executed by the processor, cause the processor to further perform:
   determining that the first user is in an exhaustive state.

5. The apparatus of claim 4, wherein determining that the first user in an exhaustive state is based upon at least one of: the physiological data, a detected impact force, and a measured impact parameter.

6. The apparatus of claim 4, wherein determining that the first user in an exhaustive state is based upon at least two impact parameters.

7. The apparatus of claim 4, wherein the instructions, when executed by the processor, cause the processor to further perform:
   selecting a fitness activity to be the second fitness activity based upon the determination that the user is in an exhaustive state.

8. The apparatus of claim 4, wherein the operating of the at least one of the display devices to instruct a first user to perform a second fitness activity configured to simulate a second sporting action of the specific sport is initiated in response to a determination that the user is in a exhausted state.

9. The apparatus of claim 1, wherein the instructions, when executed by the processor, cause the processor to further perform:
   using at least a portion of the display devices, visually mapping the location of the detected impact forces.

10. The apparatus of claim 9, wherein the visual mapping utilizes different colors to represent different values of an impact parameter.

11. The apparatus of claim 9, wherein the visual mapping is configured to utilize different visual representations based upon different values of physiological data.

12. The apparatus of claim 1, wherein the instructions, when executed by the processor, cause the processor to further perform:
   during the first time frame, altering the operational state of at least one display device to instruct a second user to perform a second fitness activity configured to simulate a sporting action of the specific sport, wherein a combination of instructional cues to the first user and the instructional cues to the second user are configured replicate interaction of the first user and the second user during a sporting event of the specific sport.

13. The apparatus of claim 1, wherein a dimension of the perimeter is adjustable based upon the specific sporting action to be simulated.

14. The apparatus of claim 13, wherein the instructions, when executed by the processor, cause the processor to further perform:
   automatically adjusting a dimension of the perimeter based, at least in part, according to a fitness activity to be implemented.

15. The apparatus of claim 13, wherein the dimension of the perimeter is selected from the group consisting of: height, circumference, shape, and combinations thereof.

* * * * *